United States Patent
Hu et al.

(10) Patent No.: US 10,957,186 B2
(45) Date of Patent: Mar. 23, 2021

(54) REDUCING FALSE ALARMS IN SURVEILLANCE SYSTEMS

(71) Applicant: OmniVision Technologies, Inc., Santa Clara, CA (US)

(72) Inventors: Cheng-Lun Hu, Singapore (SG); Dong Shi, Singapore (SG); Chung-An Wang, Singapore (SG); Lu Chang, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 41 days.

(21) Appl. No.: 16/204,874

(22) Filed: Nov. 29, 2018

(65) Prior Publication Data
US 2020/0175845 A1    Jun. 4, 2020

(51) Int. Cl.
*G08B 29/18*   (2006.01)
*H04N 5/60*   (2006.01)
*G08B 13/196*   (2006.01)

(52) U.S. Cl.
CPC ....... *G08B 29/185* (2013.01); *G08B 13/1966* (2013.01); *G08B 13/19695* (2013.01); *H04N 5/60* (2013.01)

(58) Field of Classification Search
None
See application file for complete search history.

(56) References Cited

U.S. PATENT DOCUMENTS

| | | | | |
|---|---|---|---|---|
| 6,740,915 B1* | 5/2004 | Rhodes | ............. | H01L 21/82340 257/291 |
| 10,574,890 B2* | 2/2020 | Moloney | ............ | G06K 9/00288 |
| 2005/0231353 A1* | 10/2005 | Dipoala | ............... | G08B 29/183 340/522 |
| 2017/0078749 A1 | 3/2017 | PangZe | | |
| 2017/0109983 A1* | 4/2017 | Flint | ................... | H04M 1/0291 |
| 2018/0106568 A1* | 4/2018 | Hedeen | ............... | H04N 5/2253 |

(Continued)

FOREIGN PATENT DOCUMENTS

| | | |
|---|---|---|
| CN | 204334809 U | 5/2015 |
| CN | 205657791 U | 10/2016 |
| CN | 205829872 U | 12/2016 |

OTHER PUBLICATIONS

"Wireless & AC-Powered Security Cameras." ARLO, ARLO, 2018, www.arlo.com/. Accessed Nov. 29, 2018, 10 pages.

(Continued)

*Primary Examiner* — Lindsay J Uhl
(74) *Attorney, Agent, or Firm* — Christensen O'Connor Johnson Kindness PLLC

(57) ABSTRACT

A surveillance system includes an infrared sensor system coupled to output an infrared signal in response to receiving infrared light, and an audio recording system coupled to output an audio signal in response to recording sound. An image sensor is system coupled to output an image signal in response to receiving image light. A controller is coupled to the infrared sensor system, the audio recording system, and the image sensor system. The controller includes logic that when executed by the controller causes the surveillance system to perform operations including receiving the infrared signal from the infrared sensor system, activating the audio recording system to record the sound, and activating the image sensor system to output the image signal.

20 Claims, 7 Drawing Sheets

(56) References Cited

U.S. PATENT DOCUMENTS

2018/0129885 A1* 5/2018 Potter ................ G06K 9/00288
2018/0249134 A1* 8/2018 Siminoff ................ H04N 7/188
2018/0315282 A1* 11/2018 Aldover ............... G06K 9/6202
2019/0141298 A1* 5/2019 Vaidya ................. G11B 27/036

OTHER PUBLICATIONS

"Video Doorbells and Security Cameras for Your Smartphone." Ring, Ring, 2018, ring.com/. Accessed Nov. 29, 2018, 7 pages.
PRC (China) Application No. 201911192663.7—Office Action with English Translation dated Nov. 26, 2020, 24 pages.

\* cited by examiner

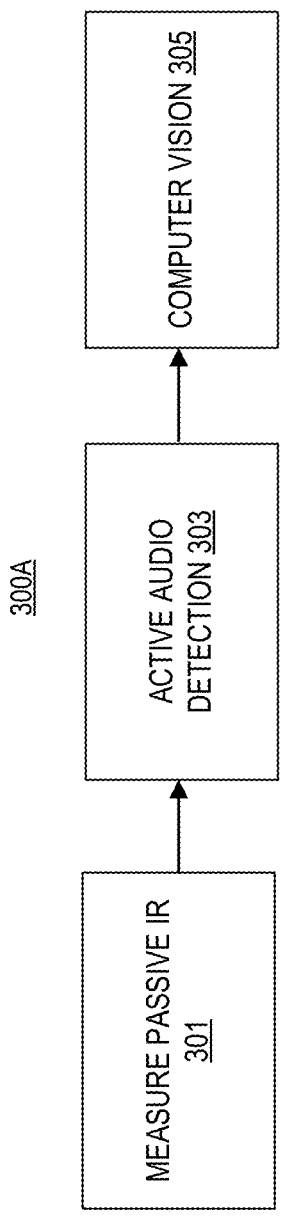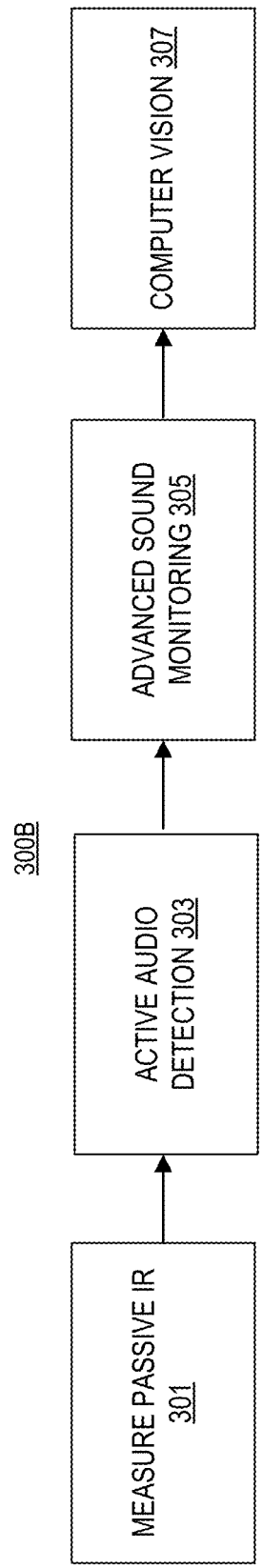

REDUCING FALSE ALARMS IN SURVEILLANCE SYSTEMS

TECHNICAL FIELD

This disclosure relates generally to surveillance systems.

BACKGROUND INFORMATION

Cameras for the home and business are becoming popular consumer products. Cameras may be a cost-effective way to have a surveillance system at a relatively low price.

Existing camera systems may suffer from undesirable technological shortcomings. Some camera systems may turn on to record insignificant events based on false positives or the like. For example, motion activated cameras may turn on when there is no person or thing moving. This may cause the camera system to waste power.

BRIEF DESCRIPTION OF THE DRAWINGS

Non-limiting and non-exhaustive examples of the invention are described with reference to the following figures, wherein like reference numerals refer to like parts throughout the various views unless otherwise specified.

FIGS. 3A-3D illustrate methods of operating the surveillance system of FIG. 1, in accordance with examples of the present invention.

Figure 1:
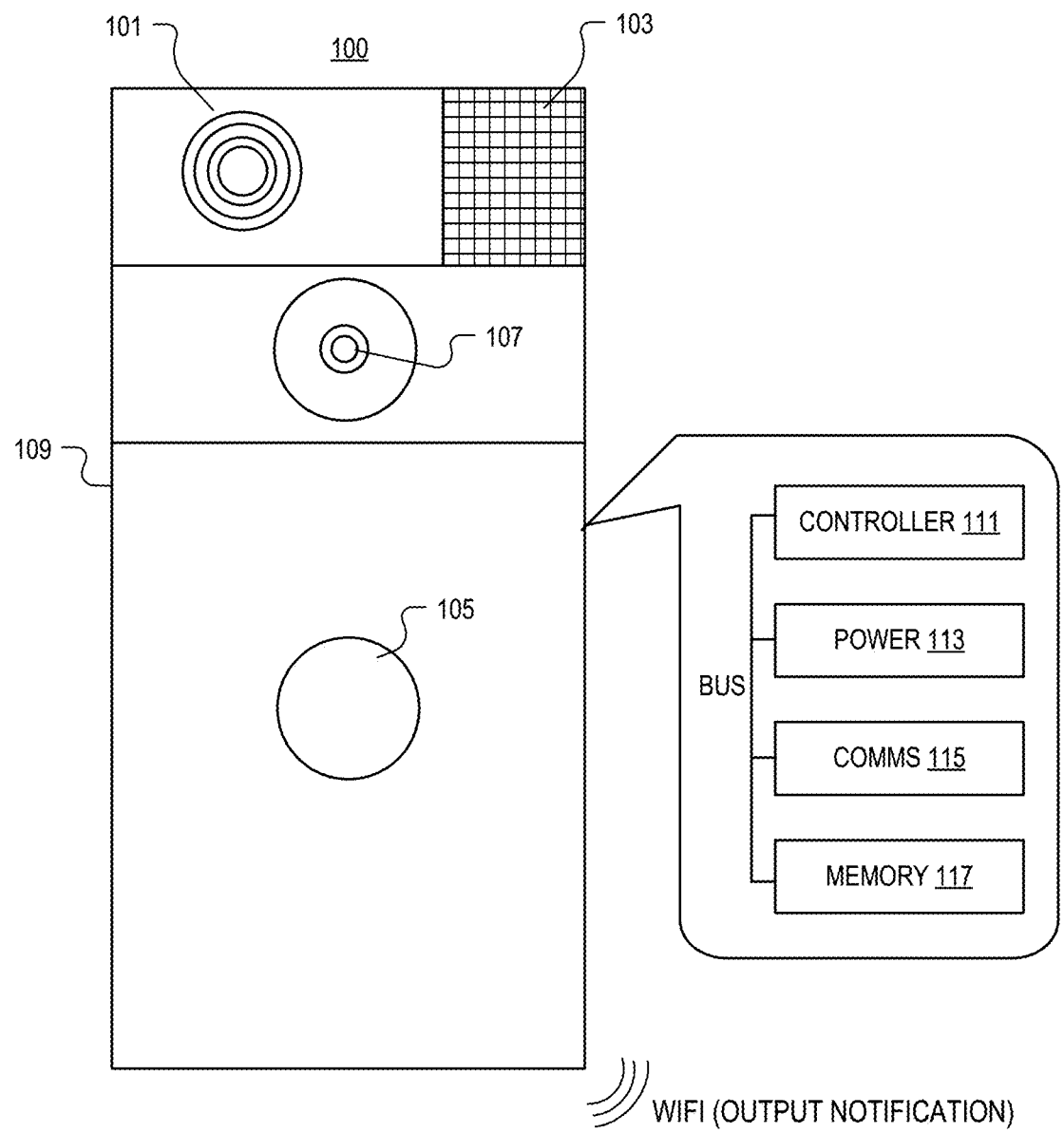
FIG. 1 illustrates a surveillance system, in accordance with an example of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a system and method for reducing false alarms in surveillance systems are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

The disclosure herein relates to reducing power consumption of surveillance systems (see infra surveillance system 100 of FIG. 1) by decreasing the system's controller usage rate. To reduce power consumption, an acoustic activity detector (see infra audio recording system 103 of FIG. 1) may be implemented in a digital integrated circuit coupled with audio codec functionalities. This may reduce the number of false alarms that the surveillance system registers. The acoustic activity detector is activated after a passive infrared (IR) motion sensor senses IR light. The acoustic activity detector may then activate sophisticated computer vision algorithms running on the controller once the system is awake.

This hierarchical activation of the surveillance system may prevent the full system from turning on in the event of a false alarm. For example, if just an IR sensor was used, excessive sunlight may cause the security system to turn on and drain the batteries. Accordingly, each of the surveillance systems disclosed herein my use progressively more power to verify that a security event is in fact real (e.g., a person, vehicle, or animal activating the system).

Since moving objects generate both motion and sound activity, humans are able to determine if someone is walking near them by analyzing both visual and auditory information. The devices herein use machine analogs of these biological systems to prevent false positives. The electronics here realize acoustic activity detection (AAD) circuitry, and the AAD can use a digital circuit to extend battery life of portable devices like a doorbell camera. Using motion and acoustic sensors allows the controller (e.g., the brain of the system) to only be triggered in cases where the infrared sensor circuit (e.g., the eyes of the system) detects motion, and the acoustic detection circuit (e.g., the ears of the system) detects activities.

In some examples, a comprehensive detection system to monitor visual and audio signals is proposed that avoids false alarms while saving power. A first level detection system (always awake) employs ultra-low power passive IR sensing (which may be prone to false alarms). A second level detection system (which may be awakened by the first level detection system) uses low-power noise based acoustic activity detection (e.g., employing infinite impulse response filter circuitry) to "check" the first level system and prevent false alarms. The third level detection system employs normal power advanced sound monitoring, which may run on a BA-22 processor based digital signal processor (DSP). And the fourth level detection system may include high power computer vision algorithms running on a high-performance processor (e.g., with central processing unit and/or visual processing unit). Multiple detection levels help to avoid false alarms, and the levels are arranged in tiers, with more advanced (but power-consuming) detection positioned further downstream. This may be used to save power in battery operated doorbell security systems or the like.

The following description discusses the examples discussed above, as well as other examples, as they relate to the figures.

FIG. 1 illustrates a surveillance system 100, which includes infrared sensor 101, audio recording system 103, button 105, image sensor system 107, housing 109, controller 111, power circuitry 113, communication circuitry 115, and memory 117. In the illustrated example, all of the components depicted (and components that are not depicted here) may be electrically coupled together via a bus or the like.

As shown, infrared (IR) sensor system 101 is coupled to output an infrared signal in response to receiving infrared light, and audio recording system 103 is coupled to output an audio signal in response to recording sound. Image sensor system 107 is coupled to output an image signal in response to receiving image light (e.g., light from an image subject, such as a person, animal, or vehicle). Controller 111 (which may include a central processing unit (CPU), a vision processing unit (VPU), and may be part of a distributed system, or the like) is coupled to infrared sensor system 101, audio recording system 103, button 105, and image sensor system 107. Controller 111 includes logic that when executed by controller 111 causes surveillance system 100 to perform a variety of operations. For example, operations may include receiving the infrared signal from infrared sensor system 101, activating audio recording system 103 (in response to receiving the infrared signal) to record sound, and activating image sensor system 107 to receive image light and output the image signal in response to recording a specific sound profile. In some examples, controller 111 may be coupled to communication circuitry 113 (e.g., WiFi, RFID, 8P8C compatible circuitry or the like) to output a notification to one or more external devices (e.g., one or more computers/servers on a network, a cell phone, tablet, or the like) after audio recording system 103 records the sound. In some examples, the notification may be output after the image signal is output to the controller from image sensor system 107. The notification may include at least one of a text message, a video feed, a phone call, a sound notification, or the like.

In the depicted example, memory 117 (e.g., RAM, ROM or the like) may be included in (or coupled to) controller 111, and memory 117 is coupled to store the infrared signal, the audio signal, and the image signal. Similarly, power circuitry 113 (e.g., battery, switched mode power supply, power converter, or the like) is coupled to supply power to infrared sensor system 101, audio recording system 103, image sensor system 107, and controller 111. As shown, infrared sensor system 101, audio recording system 103, image sensor system 107, controller 111, memory 117 and power circuitry 113 are disposed in single housing 109. Housing 109 depicted here may be positioned on the entrance of a home or business to observe and control ingress and egress to/from the building. Housing may be coupled to the building power supply, a battery, or the like. Button 105 may be used as a doorbell to inform people inside the building (or remote individuals via a smartphone or the like) that someone is at the door. Pressing button 105 may cause a notification to be sent from surveillance system 100. Controller 111 may receive a press signal, and the press signal causes the controller to perform operations such as activating any one of the components described above or sending a notification.

In some examples, controller 111 may recognize at least one of a person or an animal in the image signal from image sensor system 107 using a computer vision algorithm disposed in the logic in controller 111. This may prompt a notification to an external device (e.g., a home owner's smart phone or the like) from surveillance system 100 that a person or animal is near the house. In some examples, the notification is output to a wireless Internet network using a wireless router included in communication circuitry 115.

Figure 2A:
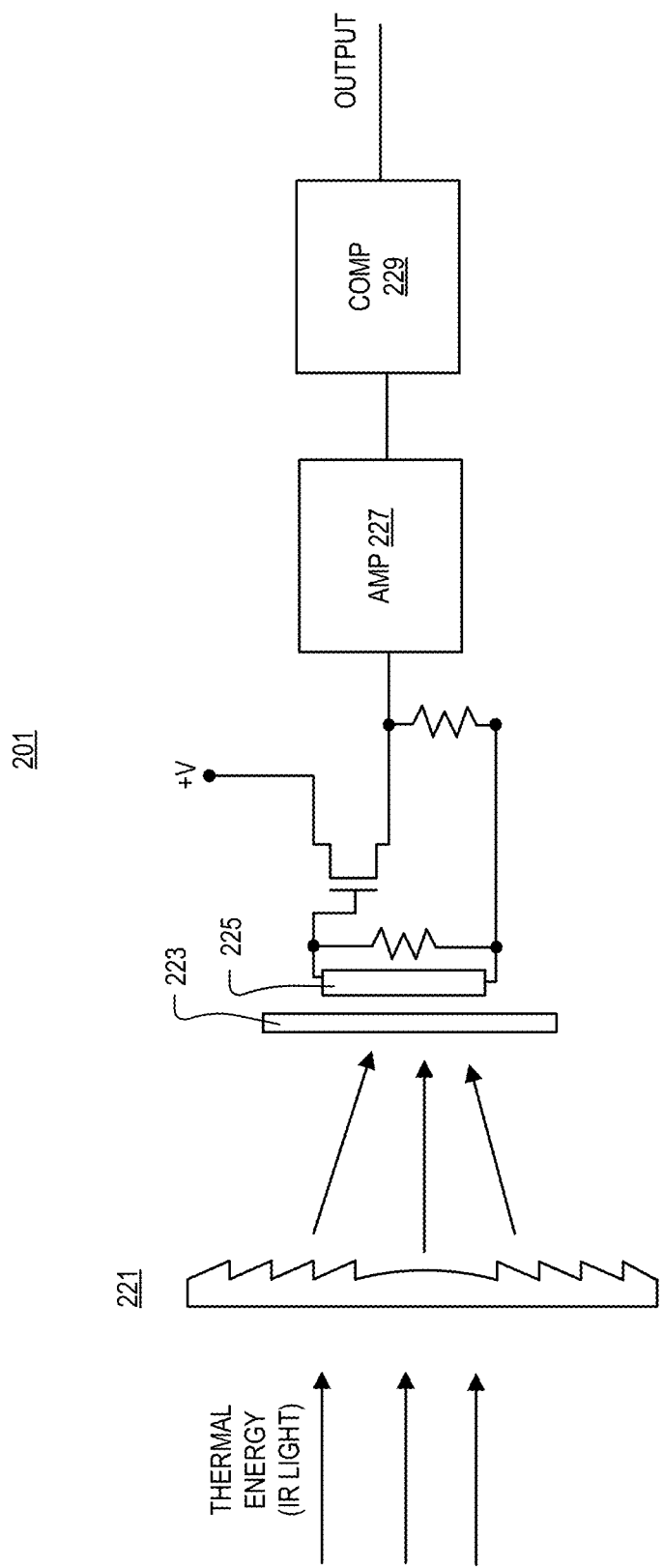
FIG. 2A illustrates an infrared sensor system included in the surveillance system of FIG. 1, in accordance with an example of the present invention.

FIG. 2A illustrates an infrared sensor system 201 included in the surveillance system of FIG. 1. As illustrated, infrared sensor 225 is coupled to output the infrared signal in response to receiving the infrared light. As shown, Fresnel lens 221 is positioned to direct infrared light into infrared sensor 225 through IR filter 223. Amplifier 227 is coupled to infrared sensor 225 to amplify the infrared signal, and comparator 229 is coupled to compare the infrared signal (after the infrared signal is amplified) to a threshold value. When the infrared signal is greater than or equal to the threshold value, comparator 229 outputs the infrared signal to the controller. In the depicted example, a first resistor is coupled between input and output terminals of infrared sensor 225. A gate terminal of a transistor is coupled to a terminal of the infrared sensor 225 and a first terminal of the transistor is coupled to a power rail and a second terminal of the transistor is coupled to amplifier 227 and a second resistor.

Figure 2B:
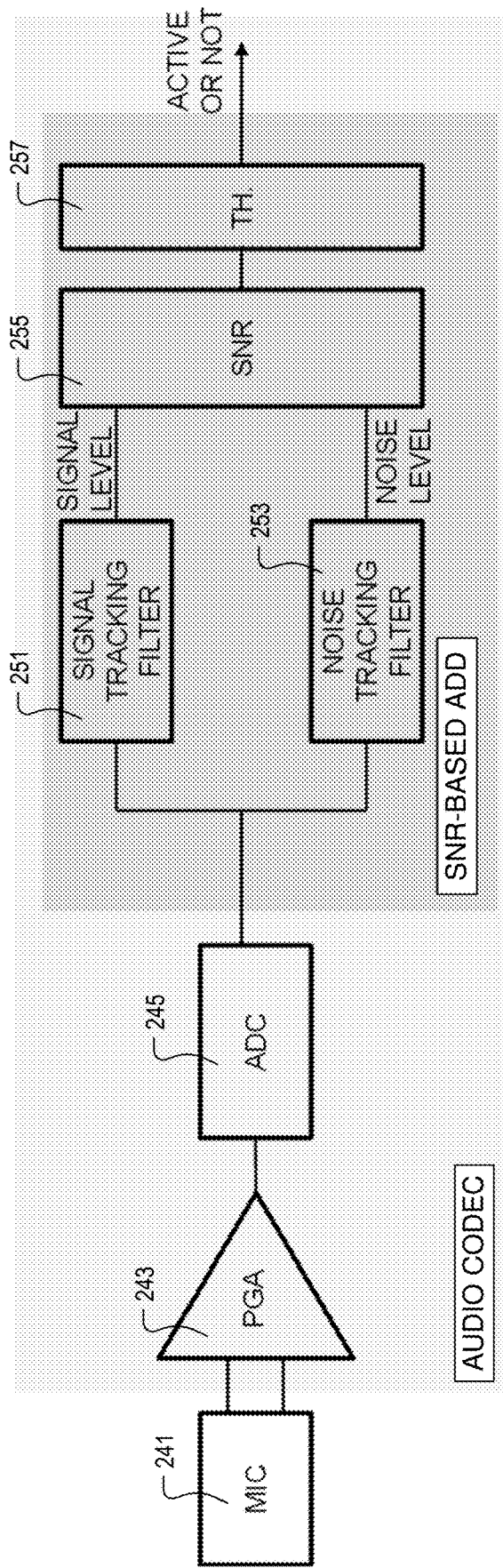
FIG. 2B illustrates an audio recording system included in the surveillance system of FIG. 1, in accordance with an example of the present invention.

FIG. 2B illustrates an audio recording system 203 included in the surveillance system of FIG. 1. In the depicted example, microphone 241 is coupled to output an audio signal in response to recording a sound. In the depicted example, mic 241 is coupled to a programmable gate array 243 to amplify the output of mic 241. Programmable gate array 243 is coupled to analog to digital converter 245 to convert the amplified analog signal into a digital signal. The microphone 241 is coupled to an acoustic activity detection (AAD) circuit (that is signal to noise (SNR) based) to receive the audio signal. The output of ADC 245 is sent to signal-tracking filter circuit 251, and noise-tracking filter circuit 253. The outputs of filter circuit 251 and filter circuit 253 are coupled to signal-to-noise calculator 255, which is coupled to receive a programmable threshold signal-to-noise ratio (SNR) value 257. In the depicted example, the threshold is 10 dB.

Figure 2C:
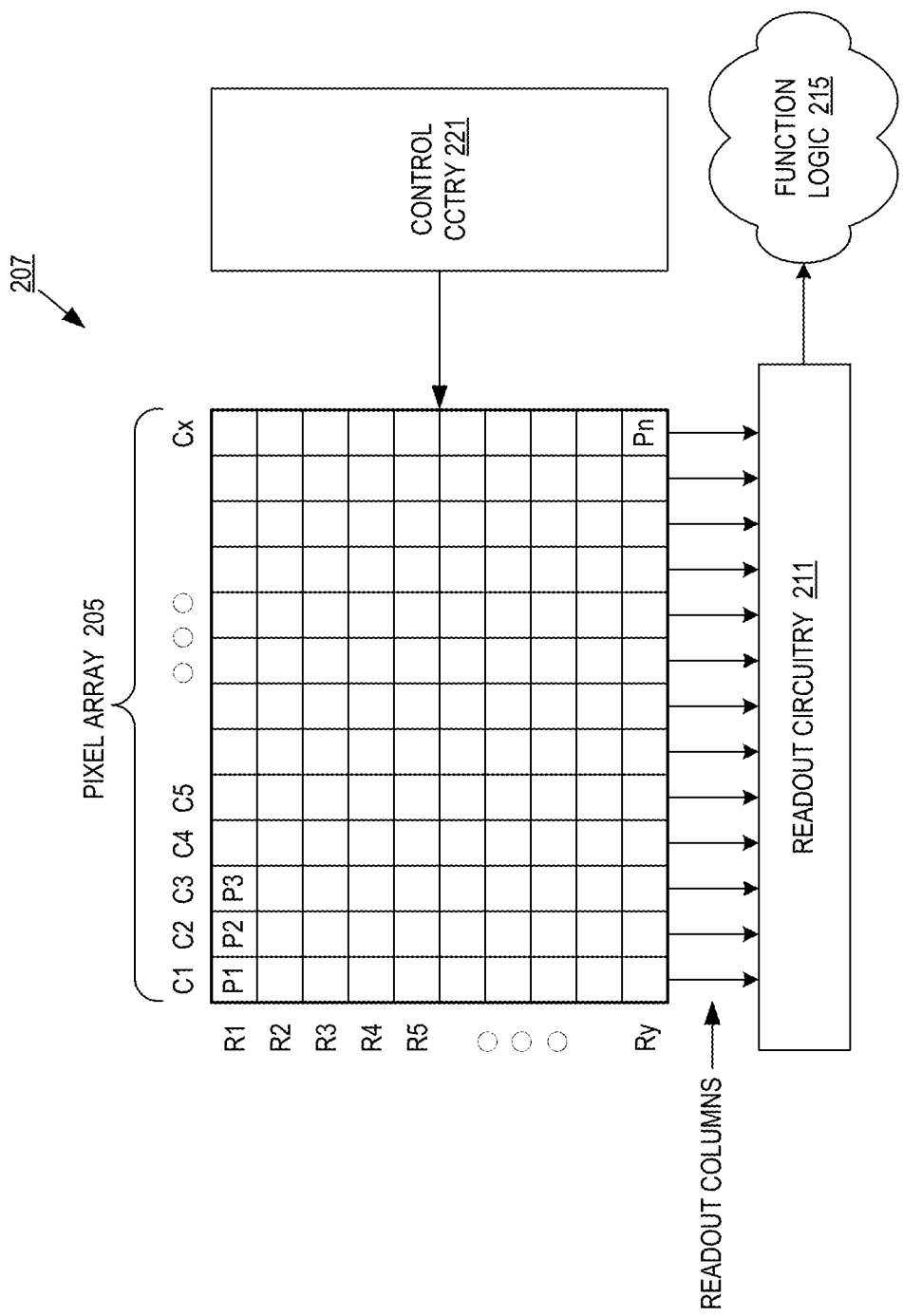
FIG. 2C illustrates an image sensor system included in the surveillance system of FIG. 1, in accordance with an example of the present invention.

FIG. 2C illustrates an imaging system 207 (or more specifically an image sensor system) included in the surveillance system of FIG. 1. Imaging system 207 includes pixel array 205, control circuitry 221, readout circuitry 211, and function logic 215. In one example, pixel array 205 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, the rows and columns do not necessarily have to be linear and may take other shapes depending on use case.

In one example, after each image sensor photodiode/pixel in pixel array 205 has acquired its image data or image charge, the image data is readout by readout circuitry 211 and then transferred to function logic 215. Readout circuitry 211 may be coupled to readout image data from the plurality of photodiodes in pixel array 205. In various examples, readout circuitry 211 may include amplification circuitry, analog-to-digital (ADC) conversion circuitry, or otherwise. Function logic 215 may simply store the image data or even alter/manipulate the image data by applying post image effects (e.g., crop, rotate, remove red eye, adjust brightness, adjust contrast, or otherwise). In one example, readout circuitry 211 may readout a row of image data at a time along readout column lines (illustrated) or may readout the image data using a variety of other techniques (not illustrated), such as a serial readout or a full parallel readout of all pixels simultaneously.

In one example, control circuitry 221 is coupled to pixel array 205 to control operation of the plurality of photodiodes in pixel array 205. Control circuitry 221 may be configured to control operation of the pixel array 205. For example, control circuitry 221 may generate a shutter signal for controlling image acquisition. In one example, the shutter signal is a global shutter signal for simultaneously enabling all pixels within pixel array 205 to simultaneously capture their respective image data during a single acquisition window. In another example, the shutter signal is a rolling shutter signal such that each row, column, or group of pixels is sequentially enabled during consecutive acquisition windows. In another example, image acquisition is synchronized with lighting effects such as a flash.

Figure 3C:
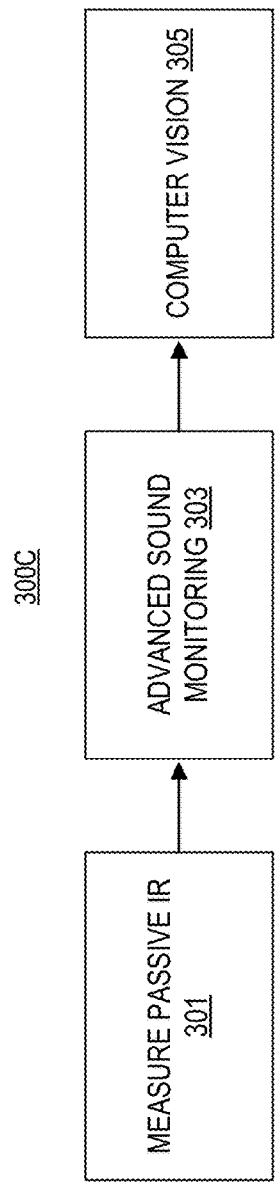

FIGS. 3A-3C illustrate methods of operating the surveillance system of FIG. 1. As described above, any of these techniques may be used to operate the hardware of the surveillance system of FIG. 1, in accordance with the teachings of the present disclosure. One of ordinary skill in the art will appreciate that the blocks depicted in methods 300A-300D may occur in any order, and even in parallel, and that steps and features may have been omitted for simplicity of illustration. Moreover, additional blocks may be added to, or removed from, methods 300A-300D in accordance with the teachings of the present disclosure.

FIG. 3A depicts a first method 300A for operating the surveillance system. Block 301 show first measuring passive IR light with an infrared sensor system. In this example, the IR sensor system may output an infrared signal to the system controller. In the depicted example, the IR sensor system may consume 0.35 mA of power.

Block 303 illustrates, in response to receiving the infrared signal (e.g., when the IR sensor receives a threshold amount of IR radiation—e.g., a luminance threshold, a duration threshold, or the like), activating an audio recording system, where the audio recording system is coupled to output an audio signal to the controller in response to recording a sound. In the depicted example, the audio recording system may consume 01-1.5 mA of power.

Block 305 illustrates activating an image sensor system to receive image light, where the image sensor system is coupled to the controller to output an image signal. In the depicted example, the image sensor system is activated in response to the audio recording system recording a sound with particular threshold characteristics (e.g., volume, duration, waveform, or the like), and outputting an audio signal to the controller. In the depicted example, the image sensor system may consume 100-300 mA of power.

FIG. 3B depicts a second method 300B for operating the surveillance system. Like FIG. 3A, block 301 illustrates measuring passive IR light with an infrared sensor system. This may be achieved by receiving infrared light, focused by a Fresnel lens and passed through an infrared light filter, with an infrared sensor coupled to output an infrared signal.

Block 303 depicts activating an active audio detection system. This may be used to determine if the IR light disturbance (that caused the system to start the activation sequence) is an event that is worth waking other components and using additional energy to record, or if the event is just a false alarm (e.g., the IR sensor getting too much sunlight).

Block 305 depicts then activating advanced sound monitoring if the low power active audio detection system registers sound with a threshold characteristic (e.g., volume, duration, or the like). The advanced sound monitoring circuitry consumes more power than the active sound detection circuitry, and may have additional functionality (e.g., examines the waveforms of the sounds to see if the sound is characteristic of an event such as footsteps, talking, or the like). Advanced sound monitoring may employ machine-learning algorithms, such as a neural net or the like, to characterize a sound. Activating the audio recording system may include activating the active sound detection circuitry, and then the advanced sound monitoring circuitry at the same or a different time.

Block 307 shows activating an image sensor system to receive image light and output image data. In some examples, in response to receiving the image signal with the controller, the controller may recognize at least one of a person or an animal in the image signal using a computer vision algorithm disposed in the logic. In some examples, machine-learning algorithms, such as a convolutional neural net or the like, may be used to analyze image data and determine the contents of the images. It is appreciated that while the controller here is described as a discrete device, the controller may be a distributed system, where some processing occurs locally (e.g., across many pieces of hardware), and/or some processing occurs remotely (e.g., on many remote severs), or the like.

FIG. 3C depicts a third method 300C for operating the surveillance system. In the depicted example, block 301 shows measuring passive IR light. Unlike the other examples, block 303 shows commencing advanced sound monitoring (e.g., higher power calculations) immediately after determining an event occurred using the passive IR sensor. Like the other examples, block 305 shows activating computer vision after verifying the security disturbance via processing of the sound.

Figure 3D:
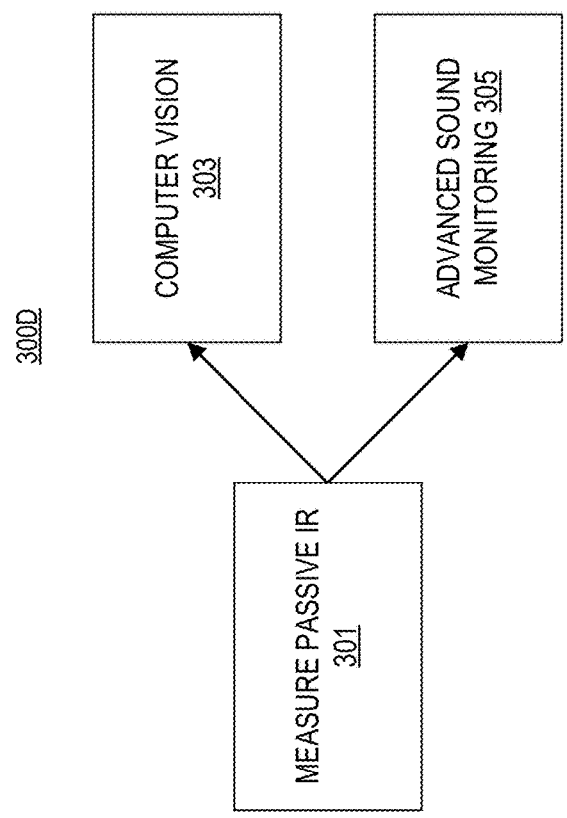

FIG. 3D depicts a fourth method 300D for operating the surveillance system. In the depicted example, block 301 shows measuring passive IR light. However, blocks 303 and 305 show that the image sensor system is activated at the same time as the audio recording system. Thus, in some examples, these systems may be used in parallel to determine that a security disturbance is "real".

Figure 4:
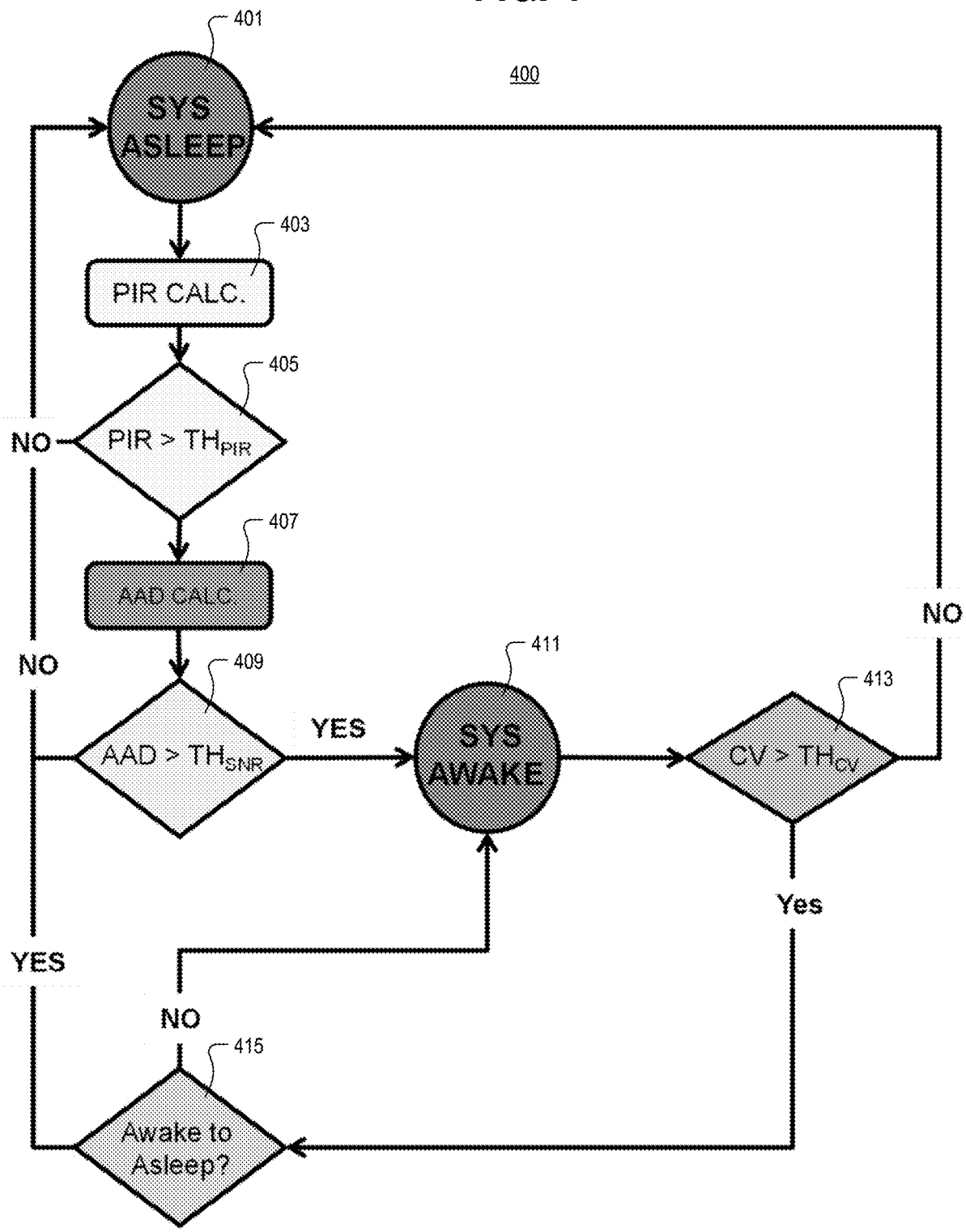
FIG. 4 illustrates a method of operating the surveillance system of FIG. 1, in accordance with an example of the present invention.

FIG. 4 illustrates a (more detailed) method 400 of operating the surveillance system of FIG. 1. One of ordinary skill in the art will appreciate that the blocks depicted in method 400 may occur in any order, and even in parallel, and that steps and features may have been omitted for simplicity of illustration. Moreover, additional blocks may be added to or removed from method 400 in accordance with the teachings of the present disclosure.

Block 401 shows the system asleep. In this state the system may be in a very low power mode, with only the passive IR (PIR) sensor system turned on.

Block 403 shows passively calculating the quantity of IR light received by the IR sensor system. This may occur when the system is "asleep".

Block 405 shows determining if the IR light received is greater than a threshold amount of IR light. If the amount of IR light received is less than the threshold, the system remains in sleep mode.

Block 407 depicts if the IR light is greater than the threshold value, the system then turns on the audio recording system and begins active audio detection (AAD) by recording and listening for sounds.

Block 409 depicts the system calculating if the recorded sound surpasses a certain threshold (e.g., a volume threshold, a duration threshold, or the like). If the answer is no, then the system may return to the sleep state to conserve power.

If the recorded sound surpasses a certain threshold, block 411 illustrates waking up the system.

Block 413 illustrates using the image sensor (and computer vision disposed in logic) to determine if the image data contains some threshold condition (e.g., the presence of a person or animal). If the image does not contain the threshold condition, the system may revert back to the sleep state.

In block 415, if the image data does contain the threshold condition, the system may use the CPU/VPU running computer vision to generate a confidence score: if the confidence score is above a certain threshold then the system may remain awake; if the confidence score is below a certain threshold then the system may reenter sleep mode.

The system may repeat method 400 many times. Moreover, the various threshold conditions may be checked at predetermined frequencies or dynamic frequencies (e.g., based on user input, power level, or the like).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A surveillance system, comprising:
   an infrared sensor system coupled to output an infrared signal in response to receiving infrared light;
   an audio recording system coupled to output an audio signal in response to recording a sound, wherein the audio recording system includes active sound detection circuitry and advanced sound monitoring circuitry, wherein the advanced sound monitoring circuitry consumes more power than the active sound detection circuitry;
   an image sensor system coupled to output an image signal in response to receiving image light; and
   a controller coupled to the infrared sensor system, the audio recording system, and the image sensor system, wherein the controller includes logic that when executed by the controller causes the surveillance system to perform operations, including:
   receiving the infrared signal from the infrared sensor system;
   in response to receiving the infrared signal, activating the active sound detection circuitry;
   in response to the active sound detection circuitry registering the sound with a threshold characteristic, activating the advanced sound monitoring circuitry to record the sound and to output the audio signal; and
   in response to receiving the audio signal output by the advanced sound monitoring circuitry, activating the image sensor system to output the image signal.

2. The surveillance system of claim 1, further comprising communication circuitry coupled to the controller to communicate with one or more external devices, and wherein the controller further includes logic that when executed by the controller causes the surveillance system to perform operations, including:
   outputting a notification to the one or more external devices with the communication circuitry after the audio recording system records the sound.

3. The surveillance system of claim 1, wherein the controller further includes logic that when executed by the controller causes the surveillance system to perform operations, including:
   in response to receiving the image signal with the controller, recognizing at least one of a person or an animal in the image signal using a computer vision algorithm disposed in the logic.

4. The surveillance system of claim 1, wherein the infrared sensor system includes:
   an infrared sensor coupled to output the infrared signal in response to receiving the infrared light;
   a Fresnel lens positioned to direct the infrared light into the infrared sensor;
   an amplifier coupled to the infrared sensor to amplify the infrared signal; and
   a comparator coupled to compare the infrared signal, after the infrared signal is amplified, to a threshold value, and when the infrared signal is greater than or equal to the threshold value the comparator outputs the infrared signal to the controller.

5. The surveillance system of claim 1, wherein the threshold characteristic is a volume, a duration, or a waveform.

6. The surveillance system of claim 1, wherein the image sensor system includes:
   an image sensor including a plurality of photodiodes;
   control circuitry coupled to the plurality of photodiodes to control operation of the plurality of photodiodes; and
   readout circuitry coupled to read out the image signal.

7. The surveillance system of claim 1, further comprising:
   memory coupled to the controller and coupled to store the infrared signal, the audio signal, and the image signal; and
   power circuitry coupled to supply power to the infrared sensor system, the audio recording system, and the image sensor system.

8. The surveillance system of claim 7 wherein the infrared sensor system, the audio recording system, the image sensor system, the controller, the memory, and the power circuitry are disposed in a single housing.

9. A method, comprising:
   receiving, with a controller, an infrared signal from an infrared sensor system, wherein the infrared sensor system is coupled to output the infrared signal in response to receiving infrared light;
   in response to receiving the infrared signal, activating active sound detection circuitry of an audio recording system coupled to the controller;
   in response to the active sound detection circuitry registering a sound with a threshold characteristic, activating advanced sound monitoring circuitry of the audio recording system to record the sound and to output an audio signal, wherein the advanced sound monitoring circuitry consumes more power than the active sound detection circuitry; and
   in response to receiving the audio signal output by the advanced sound monitoring circuitry, activating an image sensor system to output an image signal, wherein the image sensor system is coupled to the controller to output the image signal in response to receiving image light.

10. The method of claim 9, further comprising outputting a notification to one or more external devices with communication circuitry, coupled to the controller, after the audio recording system records the sound.

11. The method of claim 10, wherein the notification is output to a wireless internet network using a wireless router included in the communication circuitry.

12. The method of claim 9, wherein the threshold characteristic is a volume, a duration, or a waveform.

13. The method of claim 9, further comprising, in response to receiving the image signal with the controller, recognizing at least one of a person or an animal in the image signal using a computer vision algorithm disposed in logic in the controller.

14. The method of claim 9, wherein receiving infrared light includes receiving infrared light passed through a Fresnel lens and an infrared light filter with an infrared sensor coupled to output the infrared signal.

15. The method of claim 9, wherein recording the sound with the audio recording system includes using one or more microphones and an acoustic activity detection circuit coupled to receive the audio signal.

16. The method of claim 9, further comprising:
receiving a press signal from a button with the controller in response to the button being pressed, and
activating the image sensor system in response the button being pressed.

17. The surveillance system of claim 1, wherein the advanced sound monitoring circuitry is configured to utilize a machine learning algorithm to characterize the sound.

18. The surveillance system of claim 1, wherein the active sound detection circuitry comprises a signal to noise ratio-based acoustic activity detection circuit.

19. The method of claim 9, wherein activating the advanced sound monitoring circuitry comprises utilizing a machine learning algorithm to characterize the sound.

20. The method of claim 9, wherein activating the active sound detection circuitry comprises utilizing a signal to noise ratio-based acoustic activity detection circuit.

* * * * *